US009921241B2

(12) United States Patent
Shigeno et al.

(10) Patent No.: US 9,921,241 B2
(45) Date of Patent: Mar. 20, 2018

(54) SCANNING PROBE MICROSCOPE AND MEASUREMENT RANGE ADJUSTING METHOD FOR SCANNING PROBE MICROSCOPE

(71) Applicant: Hitachi High-Tech Science Corporation, Minato-ku, Tokyo (JP)

(72) Inventors: Masatsugu Shigeno, Tokyo (JP); Yoshiteru Shikakura, Tokyo (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 47 days.

(21) Appl. No.: 15/086,560

(22) Filed: Mar. 31, 2016

(65) Prior Publication Data

US 2016/0291053 A1    Oct. 6, 2016

(30) Foreign Application Priority Data

Mar. 31, 2015  (JP) ................................. 2015-072728
Mar. 23, 2016  (JP) ................................. 2016-058655

(51) Int. Cl.
G01Q 30/06    (2010.01)

(52) U.S. Cl.
CPC .................... G01Q 30/06 (2013.01)

(58) Field of Classification Search
CPC ........ B82Y 35/00; G01Q 10/04; G01Q 10/06; G01Q 10/065; G01Q 30/04; G01Q 30/06; G01Q 60/32; G01Q 60/38; G01Q 60/366
See application file for complete search history.

(56) References Cited

U.S. PATENT DOCUMENTS

2012/0246768 A1* 9/2012 Shigeno ................. B82Y 35/00 850/5
2014/0283227 A1* 9/2014 Mosley ................. B82Y 35/00 850/1

FOREIGN PATENT DOCUMENTS

JP    2012-202841 A    10/2012

\* cited by examiner

*Primary Examiner* — Wyatt Stoffa
*Assistant Examiner* — Hsien Tsai
(74) *Attorney, Agent, or Firm* — Banner & Witcoff, Ltd.

(57) ABSTRACT

A scanning probe microscope has a cantilever having: a probe that is to be contacted or approached on a surface of a sample; and a processor that operates to perform a process including: calculating a measurement width MW and an offset value OV from a minimum value $S_{min}$ and a maximum value $S_{max}$ of a signal indicating a displacement of the cantilever with the following Equations (1) and (2) when a prescanning operation is performed before the measurement data is acquired by the probe microscope controller; and adjusting at least one of the offset value OV and the measurement width MW based on a temporal variation of the signal at the same position on the surface of the sample when the prescanning operation is performed.

$$MW=(S_{max}-S_{min}) \quad \text{Equation (1)}$$

$$OV=(MW/2)+S_{min} \quad \text{Equation (2)}$$

5 Claims, 3 Drawing Sheets

SCANNING PROBE MICROSCOPE AND MEASUREMENT RANGE ADJUSTING METHOD FOR SCANNING PROBE MICROSCOPE

CROSS-REFERENCE TO RELATED APPLICATION

This application claims priority from Japanese Patent Applications No. 2015-072728, filed on Mar. 31, 2015, and No. 2016-058655, filed on Mar. 23, 2016, the entire subject matters of which is incorporated herein by reference.

BACKGROUND

1. Field of the Invention

The present disclosure relates to a scanning probe microscope which is used to detect a physical interaction between a sample and a probe and to control a distance between the sample and the probe, and to acquire measurement data of physical interaction. The present disclosure also relates to a measurement range adjusting method and a measurement range adjusting program for the scanning probe microscope.

2. Description of the Related Art

A scanning probe microscope serves to measure a surface shape or physical properties of a sample by causing a probe to approach or contact the sample. There are many types of measurement modes for the scanning probe microscope, such as a scanning tunneling microscope (STM) and an atomic force microscope (AFM). AFM is most commonly used, and a plurality of modes for AFM is used, such as (1) a contact mode in which an atomic force between a probe and a sample is detected as deflection of a cantilever and is maintained constant to measure a surface shape of the sample, (2) a mode (hereinafter, appropriately referred to as a "dynamic force mode (DFM)") in which a shape of a sample is measured using a variation in amplitude of a probe due to an intermittent force acting between the sample and the probe when a cantilever is forced to vibrate in the vicinity of a resonance frequency using a piezoelectric element or the like and the probe is made to contact or approach the sample. An example of DFM is disclosed in JP-A-2012-202841.

The scanning probe microscope operating in various modes detects a signal indicating a displacement of a cantilever, relatively scans the surface of a sample with a probe while maintaining physical quantities (such as a force or vibration amplitude) between the cantilever and the surface of the sample constant based on the detected signal, and acquires a surface shape of the sample or physical measurement data as an interaction result between the cantilever and the sample. In this case, the signal is appropriately amplified and is used to acquire the measurement data.

In detecting a signal, when convex-concave of a surface of a sample is large, the signal intensity also increases and it is thus necessary to increase a measurement width (a maximum value and a minimum value) of a range in which the signal is taken so as not to miss the signal. On the other hand, when the measurement width is excessively large in detecting fine convex-concave of the surface, a signal is not missed but there is a possibility that a minute signal cannot be detected or a dynamic range or an S/N ratio after the signal is amplified will degrade.

Accordingly, before measurement data is acquired, the measurement width in the main measurement is manually set from the maximum value and the minimum value of the signal detected by scanning a representative surface of the sample in advance.

The applicant of the present disclosure provides scanning probe microscopes that appropriately adjust an output of a signal by amplifying the signal (a displacement signal of a cantilever or a physical signal as an interaction result between the cantilever and the sample) when a surface of a sample is roughly scanned in advance using a known automatic gain control (AGC) circuit.

However, in measurement using the scanning probe microscope, a signal before being amplified may drift during measurement because the ambient temperature varies, a creep phenomenon may occur, in which a deformation of a piezoelectric element causing the cantilever to perform scanning is not constant.

Particularly, in detecting fine convex-concave of the surface of the sample or the physical signal, the measurement width is set to be small for the purpose of increasing the S/N ratio. Accordingly, when a drift occurs and thus the signal departs from the measurement width, "lost signal" in which the signal cannot be detected occurs. Since the drift is likely to increase as the measuring time extends, there may be a problem in that an influence of the drift increases in measuring a large-area sample which requires a long measuring time.

SUMMARY

The present disclosure has been made in view of the above-described circumstances, and one of objects of the present disclosure is to provide a scanning probe microscope and a measurement range adjusting method and a measurement range adjusting program for the scanning probe microscope that can correct a drift and accurately acquire measurement data even when an ambient temperature or the like varies and thus a signal drifts during measurement.

According to an exemplary embodiment of the present disclosure, there is provided a scanning probe microscope comprising: a cantilever having a probe that is to be contacted or approached on a surface of a sample; a displacement detector that detects a signal indicating a displacement of the cantilever; a probe microscope controller that acquires measurement data based on the signal while the surface of the sample is relatively scanned with the probe and while maintaining a predetermined physical quantity between the cantilever and the surface of the sample constant; and a processor that operates to perform a process including: calculating a measurement width MW and an offset value OV from a minimum value $S_{min}$ and a maximum value $S_{max}$ of the signal with the following Equations (1) and (2) when a prescanning operation of roughly scanning the surface of the sample with the prove is performed before the measurement data is acquired by the probe microscope controller; and adjusting at least one of the offset value OV and the measurement width MW based on a temporal variation of the signal at the same position on the surface of the sample when the prescanning operation is performed.

$$MW = (S_{max} - S_{min}) \quad \text{Equation (1)}$$

$$OV = (MW/2) + S_{min} \quad \text{Equation (2)}$$

According to the scanning probe microscope, even when an ambient temperature or the like varies and a signal drifts during measurement, the drift is corrected based on the temporal variation of the signal at the same position on the surface of the sample when the prescanning operation is performed and it is thus possible to accurately acquire the measurement data.

Examples of the signal include a surface shape of the sample and a physical signal as an interaction result between the cantilever and the sample.

The scanning probe microscope may be configured such that, wherein the processor operates to perform the process further including: determining a gain for amplifying the signal based on the measurement width and the corrected offset value, wherein the scanning probe microscope further includes: an amplifier that amplifies the signal based on the gain determined by the processor to generate an amplified signal, and wherein the probe microscope controller acquires the measurement data based on the amplified signal.

According to the scanning probe microscope, since the signal of which the drift is corrected can be appropriately amplified, it is possible to further accurately acquire the measurement data.

The amplifier may include an automatic gain control circuit.

According to the scanning probe microscope, it is possible to appropriately amplify the signal using a known automatic gain control circuit.

According to another exemplary embodiment of the present disclosure, there is provided a measurement range adjusting method for a scanning probe microscope having a cantilever having a probe that is to be contacted or approached on a surface of a sample, the method including: calculating a measurement width MW and an offset value OV from a minimum value $S_{min}$ and a maximum value $S_{max}$ of a signal indicating a displacement of a cantilever with the following Equations (1) and (2) when a prescanning operation of roughly scanning the surface of the sample with the prove is performed; adjusting at least one of the offset value OV and the measurement width MW based on a temporal variation of the signal at the same position on the surface of the sample when the prescanning operation is performed; and acquiring measurement data based on the signal while the surface of the sample is relatively scanned with the probe and while maintaining a predetermined physical quantity between the cantilever and the surface of the sample constant.

$$MW = (S_{max} - S_{min}) \qquad \text{Equation (1)}$$

$$OV = (MW/2) + S_{min} \qquad \text{Equation (2)}$$

According to still another exemplary embodiment of the present disclosure, there is provided a non-transitory computer readable recording medium storing computer readable instructions for a processor that controls a scanning probe microscope having a cantilever having a probe that is to be contacted or approached on a surface of a sample, wherein the instructions, when executed by the processor, causing the scanning probe microscope to perform: calculating a measurement width MW and an offset value OV from a minimum value $S_{min}$ and a maximum value $S_{max}$ of a signal indicating a displacement of a cantilever with the following Equations (1) and (2) when a prescanning operation of roughly scanning the surface of the sample with the prove is performed; adjusting at least one of the offset value OV and the measurement width MW based on a temporal variation of the signal at the same position on the surface of the sample when the prescanning operation is performed; and acquiring measurement data based on the signal while the surface of the sample is relatively scanned with the probe and while maintaining a predetermined physical quantity between the cantilever and the surface of the sample constant.

$$MW = (S_{max} - S_{min}) \qquad \text{Equation (1)}$$

$$OV = (MW/2) + S_{min} \qquad \text{Equation (2)}$$

DETAILED DESCRIPTION

Hereinafter, embodiments of the present disclosure will be described with reference to the accompanying drawings.

Figure 1A:
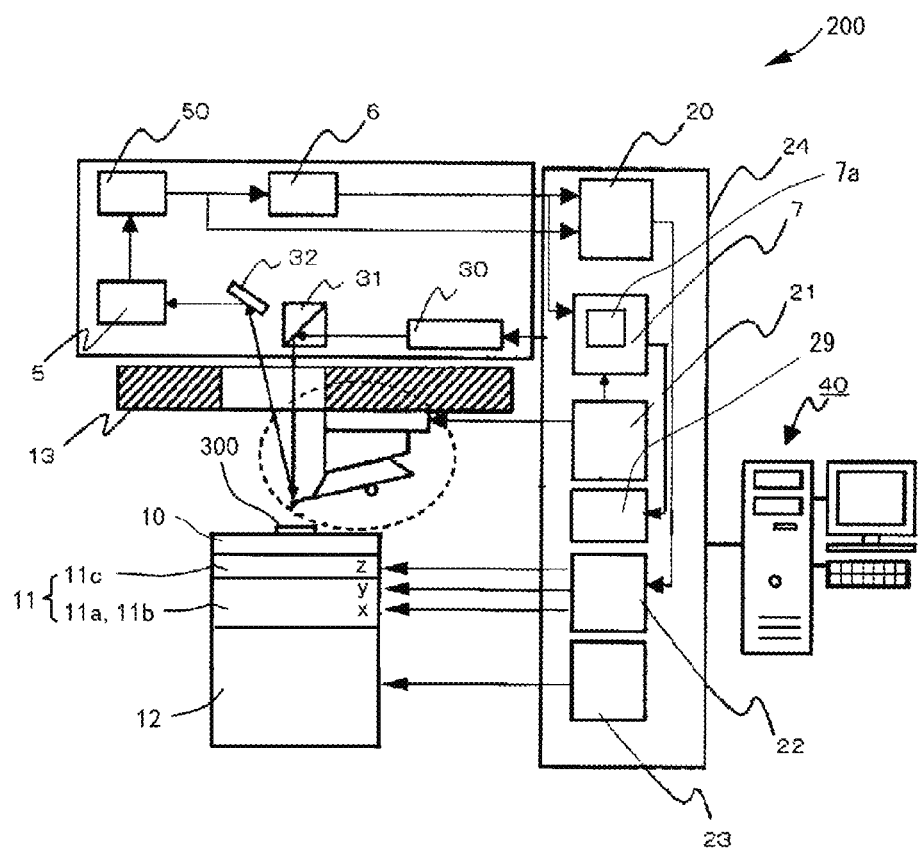
FIGS. 1A and 1B are block diagrams illustrating a scanning probe microscope according to an embodiment of the present disclosure.
Figure 1B:
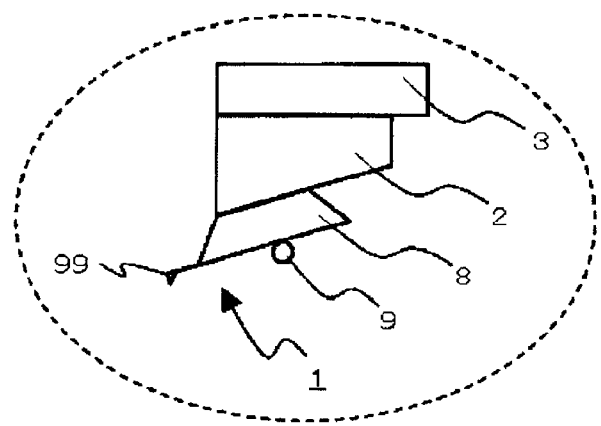

FIGS. 1A and 1B are block diagrams of a scanning probe microscope 200 according to an embodiment of the present disclosure. FIG. 1A is a diagram illustrating the entire configuration of the scanning probe microscope 200 and FIG. 1B is a partially enlarged view of the vicinity of a cantilever 1.

In FIG. 1A, the scanning probe microscope 200 includes a cantilever 1 that has a probe 99 at a tip thereof, a sample stage 10 on which a sample 300 is placed, a cantilever exciter 3 that applies vibration to the cantilever 1, an excitation power supply (excitation signal generator) 21 that drives the cantilever exciter 3, a displacement detector 5 that detects a signal indicating a displacement of the cantilever 1, an AC-DC converter 6, and a controller (a probe microscope controller 24, a computer 40).

The probe microscope controller 24 includes a frequency-vibration characteristic detector 7. The frequency-vibration characteristic detector 7 includes an automatic gain control (AGC) circuit 7a that controls a gain of a signal.

The computer 40 includes a control board that controls an operation of the scanning probe microscope 200, a central processing unit (CPU), a storage unit such as a ROM, a RAM, and a hard disk, an interface, and an operation unit.

The scanning probe microscope 200 employs a sample scanning system in which the cantilever 1 is fixed and a sample 300 is scanned.

The probe microscope controller 24 includes a Z control circuit 20 to be described later, the frequency-vibration characteristic detector 7, an excitation power supply 21, an XYZ output amplifier 22, and a coarse adjustment control circuit 23. The probe microscope controller 24 is connected to the computer 40 and can perform data communication at a high speed. The computer 40 controls operating conditions of circuits in the probe microscope controller 24, receives and controls measured data, and realizes measurement of a Q value and a resonance frequency of the cantilever 1, measurement of a Q curve (frequency-vibration characteristics), measurement of a surface shape, measurement of surface physical properties, measurement of a force curve, and the like.

The computer 40 calculates a measurement range and determines a gain of a signal input to the frequency-vibration characteristic detector 7.

The computer 40 serves as the "measurement range calculating unit", the "gain determining unit", and the "offset value correcting unit".

Signals detected by the scanning probe microscope 200, such as a Z scanner signal output from the probe microscope controller 24 to a scanner 11c; a displacement signal of the cantilever 1 output from a preamplifier 50 to the Z control circuit 20; an amplitude signal output from the preamplifier 50 to the Z control circuit 20 via the AC-DC converter 6; a phase signal detected by the frequency-vibration characteristic detector 7, a torsional amplitude (friction) signal at a specific frequency, and a longitudinal amplitude (viscoelasticity) signal at a specific frequency; and a potential signal of an offset output from the frequency-vibration characteristic detector 7 to a bias power supply circuit 29 applying a bias voltage between a probe and a sample correspond to the "signal." Parts (arrows entering the probe microscope controller 24 in FIG. 1) in which the signals are input to the probe microscope controller 24 are provided with amplifier circuits, respectively.

The amplifier circuits disposed at the parts in which the signals are input to the probe microscope controller 24 serves as the "amplifier." The amplification circuits can be mounted on a circuit board of the probe microscope controller 24 which is configured by, for example, a microcomputer.

The automatic gain control circuit 7a disposed in the frequency-vibration characteristic detector 7 serves as the "amplifier.". The automatic gain control circuit 7a includes a phase signal detecting circuit, a torsional amplitude detecting circuit, and a longitudinal amplitude detecting circuit, an amplifier is disposed at an input terminal thereof, and the amplifier of the automatic gain control circuit 7a serves as the "amplifier".

The computer 40 detects the signals input to the amplifier circuits of the probe microscope controller 24 and the signal input to the input terminal of the automatic gain control circuit 7a, determines frontages (a measurement width and an offset value), and controls the amplifier circuits and the automatic gain control circuit 7a to amplify the signals. The above-mentioned amplifier circuits may also perform automatic gain control (AGC).

The probe microscope controller 24 that acquires a surface shape of a sample or physical quantities as an interaction result between the cantilever and the sample based on the amplified signals corresponds to the "measurement data acquiring unit." The surface shape of a sample and the physical quantities as an interaction result between the cantilever and the sample correspond to the "measurement data."

The bias power supply circuit 29 applies a bias voltage directly to the sample stage 10 and is also used for KFM measuring the surface potential between the probe 99 and the sample 300 or the like.

A coarse adjustment mechanism 12 moves an actuator 11 and the sample stage 10 roughly three-dimensionally thereon and the operation thereof is controlled by a coarse adjustment control circuit 23.

The actuator (scanner) 11 moves (slightly moves) the sample stage 10 (and the sample 300) three-dimensionally and has a cylinder shape including two (biaxial) piezoelectric elements 11a and 11b moving the sample stage 10 in the x-y direction (a plane of the sample 300) and a piezoelectric element 11c moving the sample stage 10 in the z (height) direction. A piezoelectric element is an element in which crystals are deformed when an electric field is applied thereto and an electric field is generated when the crystals are forcedly deformed with an external force. A PZT (lead zirconate titanate) that is a kind of ceramic can be generally used as the piezoelectric element, but the shape or the operating method of the coarse adjustment mechanism 12 is not limited to the above description.

The piezoelectric elements 11a to 11c are connected to the XYZ output amplifier 22, and a predetermined control signal (voltage) is output from the XYZ output amplifier 22 to drive the piezoelectric elements 11a and 11b in the x and y directions and to drive the piezoelectric element 11c in the z direction. The electrical signal output to the piezoelectric element 11c is detected by the probe microscope controller 24 and is taken as the above-mentioned "measurement data". The sample 300 is placed on the sample stage 10 and the sample 300 is disposed to face the probe 99.

The cantilever 1 is in contact with a side surface of a cantilever tip 8 and has a cantilever spring structure. The cantilever tip 8 is pressed and fixed to a slope block 2 by a cantilever tip presser 9, and the slope block 2 is fixed to a vibration exciter 3. The vibration exciter 3 vibrates in response to an electrical signal from the excitation power supply 21 and causes the cantilever 1 and the probe 99 at the tip thereof to vibrate. The cantilever exciting method uses a piezoelectric element, an electric field or a magnetic field, irradiation with light, supply of a current, and the like.

A laser beam from a laser beam source 30 is incident on a dichroic mirror 31 and is applied to the rear surface of the cantilever 1, and the laser beam reflected by the cantilever 1 is reflected by a mirror 32 and is detected by the displacement detector 5. The displacement detector 5 is, for example, a quadrisected photodetector and a displacement in the vertical direction (in the z direction) of the cantilever 1 is detected as a variation in optical path (incident position) of the laser beam reflected by the cantilever 1 by the displacement detector 5. That is, a vibration amplitude of the cantilever 1 corresponds to amplitude of an electrical signal of the displacement detector 5.

The amplitude of the electrical signal of the displacement detector 5 is appropriately amplified by the preamplifier 50 and is converted into a DC level signal corresponding to the magnitude of the amplitude by the AC-DC converter 6. The preamplifier 50 merely preliminarily amplifies a signal with a constant gain and does not correspond to the "amplifier" or the "amplified signal."

The DC level signal of the AC-DC converter 6 is input to the Z control circuit 20. The Z control circuit 20 transmits a control signal to a Z signal portion of the Z output amplifier 22 so as to match a target amplitude of the probe 99 in a DFM measurement mode and the Z signal portion outputs a control signal (voltage) for driving the piezoelectric element 11c in the z direction. That is, the displacement of the cantilever 1 which is generated by an atomic force acting between the sample 300 and the probe 99 is detected by the above-mentioned mechanism, the actuator 11c is displaced to match the vibration amplitude of the probe 99 (cantilever 1) with the target amplitude, to control the contact force between the probe 99 and the sample 300. In this state, the XYZ output amplifier 22 displaces the actuators 11a and 11b in the x and y directions to scan the sample 300 and maps the surface shape or physical values.

The DC level signal of the AC-DC converter 6 is input to the frequency-vibration characteristic detector 7 of the probe microscope controller 24. The electrical signal from the excitation power supply 21 is also input to the frequency-vibration characteristic detector 7. The frequency-vibration characteristic detector 7 processes a predetermined frequency-vibration characteristic signal computed based on the inputs from the AC-DC converter 6 and the excitation power supply 21, acquires a sine signal, a cosine signal, an amplitude signal, and the like by lock-in detection, and transmits the acquired signals to the computer 40.

Regarding the displacement on the x-y plane of the sample stage 10, (i) a three-dimensional shape image from a height displacement of the sample stage 10, (ii) a phase image from a phase value in a resonance state, (iii) an error signal image based on a difference of the vibration amplitude from the target value, and (iv) a multifunctional measured image from the physical values between the probe and the sample are displayed on the computer 40 and are subjected to analysis or processing, thereby enabling the scanning probe microscope to operate as a probe microscope.

A method of calculating a measurement range, determining a gain, and acquiring measurement data will be described below.

First, the computer 40 controls the probe microscope controller 24 to perform a prescanning operation. The prescanning operation is a scanning operation of roughly moving the probe 99 before the measurement data is acquired, and for example, when the number of scanning times of main measurement of acquiring measurement data is 256, the measurement is performed for a short time with the number of scanning times set to eight to calculate the measurement range. Specifically, when the XYZ output amplifier 22 displaces the actuators 11a and 11b in the x and y directions, the number of scanning times is set to acquire a signal with the number of scanning times of eight by acquiring a reciprocation signal (a scanning operation in which the probe reciprocates and reciprocation in a direction in which the sample is moved to the left side (the probe is moved to the right side) in FIG. 1) on a (virtual) scanning line with the number of scanning times of one. The measurement method is the same as described above.

The computer 40 calculates a measurement width=(maximum value−minimum value) and an offset value=((measurement width/2)+minimum value) from the maximum value and the minimum value of the signal (DC level signal) input to the frequency vibration characteristic detector 7. The computer 40 corrects the offset value based on a temporal variation of the signal at the same position on the surface of the sample when the prescanning operation is performed.

Figure 2:
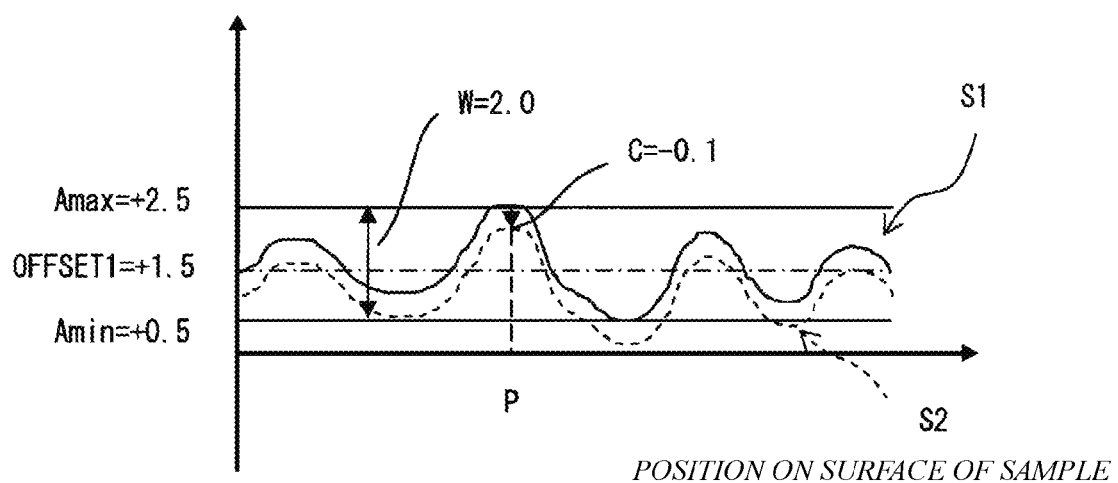
FIG. 2 is a diagram illustrating a method of calculating a measurement width and an offset value from a maximum value and a minimum value of a signal.

FIG. 2 illustrates an example of the measurement width W and the offset value OFF1.

First, the computer 40 performs a first scanning operation along the surface of the sample (for example, in the x direction) and acquires a profile S1 of a signal. Then, the computer 40 acquires the maximum value Amax and the minimum value Amin of S1 and calculates the measurement width W and the offset value OFF1. In the example illustrated in FIG. 2, Amax=+2.5 V, Amin=+0.5 V, W=+2.0 V, and OFF1=+2.0/2+0.5=+1.5 V.

Then, the computer 40 performs a second scanning operation and acquires a profile S2 of the signal. Subsequently, the computer 40 corrects the offset value OFF1 based on a temporal variation C of the signals of S1 and S2 at the same position P on the surface of the sample.

The surface state (the shape or the physical values) of the sample does not vary for a short time such as the prescanning operation, and when the signal at the same position on the surface of the sample temporally varies, the variation can be considered as a drift due to a temperature variation or the like. Therefore, the temporal variation C is considered as the drift to correct the offset value OFF1. Specifically, in FIG. 2, the temporal variation C=−0.1 V. Here, when C<0 is established, the signal drifts to the minus side and is missed from the measurement and thus the minimum value Amin is corrected. Accordingly, even when the signal drifts, the signal can be always measured. On the other hand, when C>0 is established, the signal drifts to the plus side and is missed from the measurement and thus the maximum value Amax is corrected.

Here, the temporal variation C is a value acquired by the prescanning operation, and the drift D is also predicted to increase with an increase in the number of scanning times (that is, the measuring time) in the main measurement in which the number of scanning times is larger than in the prescanning operation. Therefore, an increment by which the drift is predicted to increase in the main measurement is reflected in the temporal variation C.

For example, in this embodiment, as described above, the number of scanning times in the prescanning operation is eight and the main measurement is carried out with the number of scanning times of 256 which is 32 times. Therefore, the drift D is predicted to increase to 32 times in the main measurement and −3.2 V which is obtained by multiplying the temporal variation C by 32 is used as the drift D.

The method of estimating the increment in the drift D in the main measurement from that in the prescanning operation is not limited to the above-mentioned method.

The minimum value Amin is corrected based on the drift D and a new offset value OFF2 after being corrected is acquired.

Specifically, in the example illustrated in FIG. 2, the minimum value Amin is corrected using the drift D=−3.2 V and the offset value OFF2 is acquired based on the corrected minimum value Amin2. Specifically, Amin2=Amin+drift D=0.5+(−3.2)=−2.7 V is acquired. Accordingly, the offset value OFF2=Amax−((Amax−Amin2)/2)=(2.5+(−2.7)/2=−0.1 V is acquired.

The position P may be any position on the surface of the sample, and for example, may be set to a position at which the maximum value Amax is acquired. Temporal variations at plural positions may be acquired and an average value thereof may be set as C. In the above-mentioned example, the number of scanning times in the prescanning is eight, but when the number of scanning times is equal to or greater than three, the temporal variation C is not limited to the difference between the first and second profiles S1 and S2, and may be, for example, a difference between the first profile S1 and the final profile.

Then, the computer 40 determines the gain of the amplifier circuits and the automatic gain control circuit 7a from the measurement width W, determines the offset voltage from the corrected offset value OFF2, and controls the amplifier circuits and the automatic gain control circuit 7a such that the automatic gain control circuit 7a operates under the determined conditions. Specifically, the offset voltage (+0.1 V) for cancelling the offset value OFF2 is added to the input signal to the amplifier circuits and the automatic gain control circuit 7a. Since the drift D is a variation with the lapse of time, the offset voltage is a quantity reflecting the temporal variation.

The gain G is determined such that the gain G is constrained to the dynamic range of the amplifier circuits and the automatic gain control circuit 7a. For example, in the example illustrated in FIG. 2, the measurement width is W=2.0 V. Accordingly, when the dynamic range of the amplifier circuits and the automatic gain control circuit 7a is 20.0 V, the gain G is 20.0/2.0=10.

By causing the amplifier circuits and the automatic gain control circuit 7a to operate with the offset voltage and the gain G, it is possible to correct the drift and to reliably input a signal to the amplifier circuits and the automatic gain control circuit 7a without signal loss even when the ambient temperature or the like varies and the signal drifts during measurement.

Since the amplifier circuits and the automatic gain control circuit 7a appropriately amplify signals and input the amplified signals to the frequency-vibration characteristic detector 7 or the probe microscope controller 24, the frequency-vibration characteristic detector 7 or the probe microscope controller 24 can compute various signals such as the frequency-vibration characteristic signal with high accuracy and it is thus possible to acquire a high-accuracy phase image with an excellent S/N ratio or other information.

As described above, the computer 40 may acquire a three-dimensional shape image, an error signal image, and a multifunctional measured image, and the like in addition to the phase image as the measurement data based on the frequency-vibration characteristic signal computed by the frequency-vibration characteristic detector 7.

The amplifier circuits and the automatic gain control circuit 7a include a variable gain amplifier and can change the gain G by electronic control.

Figure 3:
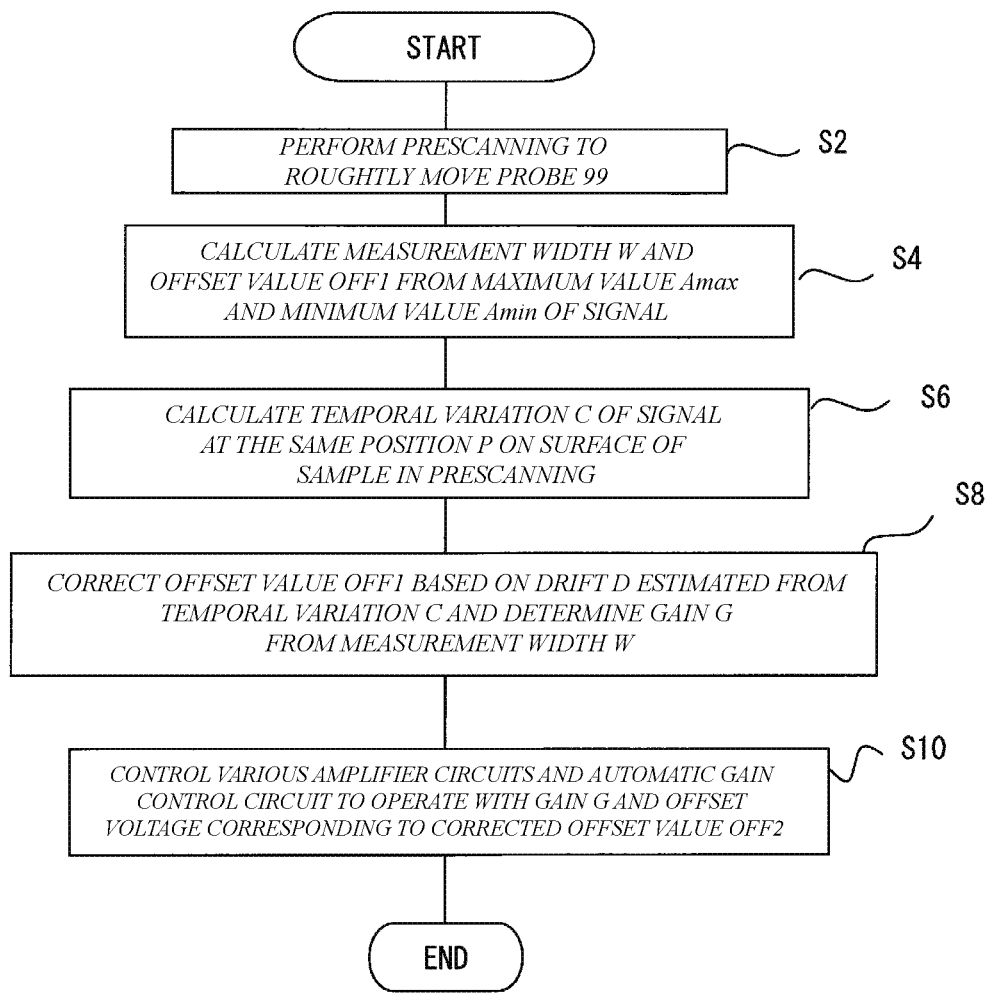
FIG. 3 is a diagram illustrating a process flow of a measurement range adjusting process in a computer.

FIG. 3 illustrates a process flow of a measurement range adjusting process which is performed by the computer 40.

First, the computer 40 controls the probe microscope controller 24 to perform a prescanning operation and roughly moves the probe 99 (step S2). Then, the computer 40 calculates the measurement width W and the offset value OFF1 from the maximum value Amax and the minimum value Amin of the acquired signal (step S4).

Then, the computer 40 calculates the temporal variation C of the signal at the same position P on the surface of the sample (step S6). The computer 40 corrects the offset value OFF1 based on the drift D estimated from the temporal variation C and determines the gain G from the measurement width W (step S8).

Then, the computer 40 causes the amplifier circuits and the automatic gain control circuit 7a to operate with the gain G acquired in step S8 and the offset voltage corresponding to the corrected offset value OFF2 (step S10), generates an amplified signal, and ends the process flow.

A measurement range adjusting program according to the present disclosure is constituted by appropriately storing the process flow described with reference to FIG. 3 as a computer program in a storage unit of the computer 40, and is executed by the probe microscope controller 24 and the CPU of the computer 40.

The present disclosure is not limited to the above-mentioned embodiment.

For example, the DFM measurement mode has been described in the embodiment, but the present disclosure can be applied to, for example, a contact mode. For example, the present disclosure can be applied to measuring a friction image in the contact mode.

The present disclosure may be applied to a cantilever scanning system in which a cantilever side of a scanning probe microscope is scanned to perform measurement.

As described with reference to the embodiment, according to the present disclosure, it is possible to correct a drift and to accurately acquire measurement data without signal loss even when an ambient temperature or the like varies and thus a signal drifts during measurement.

What is claimed is:

1. A scanning probe microscope comprising:
a cantilever having a probe that is to be contacted or approached on a surface of a sample;
a displacement detector that detects a signal indicating a displacement of the cantilever;
a probe microscope controller that acquires measurement data based on the signal while the surface of the sample is relatively scanned with the probe and while maintaining a predetermined physical quantity between the cantilever and the surface of the sample constant; and
a processor that operates to perform a process including:
calculating a measurement width MW and an offset value OV from a minimum value $S_{min}$ and a maximum value $S_{max}$ of the signal with the following Equations (1) and (2) when a prescanning operation of roughly scanning the surface of the sample with the probe is performed before the measurement data is acquired by the probe microscope controller, wherein $$MW=(S_{max}-S_{min}) \quad \text{Equation (1)}$$

$$OV=(MW/2)+S_{min} \quad \text{Equation (2); and}$$

adjusting at least one of the offset value OV and the measurement width MW based on a temporal variation of the signal at the same position on the surface of the sample when the prescanning operation is performed.

2. The scanning probe microscope according to claim 1, wherein the processor operates to perform the process further including:
determining a gain for amplifying the signal based on the measurement width and the adjusted offset value,
wherein the scanning probe microscope further comprises:
an amplifier that amplifies the signal based on the gain determined by the processor to generate an amplified signal, and
wherein the probe microscope controller acquires the measurement data based on the amplified signal.

3. The scanning probe microscope according to claim 2, wherein the amplifier includes an automatic gain control circuit.

4. A measurement range adjusting method for a scanning probe microscope having a cantilever having a probe that is to be contacted or approached on a surface of a sample, the method comprising:
calculating a measurement width MW and an offset value OV from a minimum value $S_{min}$ and a maximum value $S_{max}$ of a signal indicating a displacement of a cantilever with the following Equations (1) and (2) when a prescanning operation of roughly scanning the surface of the sample with the probe is performed;
adjusting at least one of the offset value OV and the measurement width MW based on a temporal variation of the signal at the same position on the surface of the sample when the prescanning operation is performed, wherein $$MW=S_{max}-S_{min}) \quad \text{Equation (1)}$$

$$OV=(MW/2)+S_{min} \quad \text{Equation (2); and}$$

acquiring measurement data based on the signal while the surface of the sample is relatively scanned with the probe and while maintaining a predetermined physical quantity between the cantilever and the surface of the sample constant.

5. A non-transitory computer readable recording medium storing computer readable instructions for a processor that controls a scanning probe microscope having a cantilever having a probe that is to be contacted or approached on a surface of a sample, wherein the instructions, when executed by the processor, cause the scanning probe microscope to perform:

calculating a measurement width MW and an offset value OV from a minimum value $S_{min}$ and a maximum value $S_{max}$ of a signal indicating a displacement of a cantilever with the following Equations (1) and (2) when a prescanning operation of roughly scanning the surface of the sample with the probe is performed, wherein $$MW = (S_{max} - S_{min}) \quad \text{Equation (1)}$$

$$OV = (MW/2) + S_{min} \quad \text{Equation (2);}$$

adjusting at least one of the offset value OV and the measurement width MW based on a temporal variation of the signal at the same position on the surface of the sample when the prescanning operation is performed; and acquiring measurement data based on the signal while the surface of the sample is relatively scanned with the probe and while maintaining a predetermined physical quantity between the cantilever and the surface of the sample constant.

\* \* \* \* \*